(12) United States Patent
Murui

(10) Patent No.: US 12,036,657 B2
(45) Date of Patent: Jul. 16, 2024

(54) ELECTRIC TOOL AND BATTERY PACK

(71) Applicant: Panasonic Intellectual Property Management Co., Ltd., Osaka (JP)

(72) Inventor: Itaru Murui, Nara (JP)

(73) Assignee: PANASONIC INTELLECTUAL PROPERTY MANAGEMENT CO., LTD, Osaka (JP)

( * ) Notice: Subject to any disclaimer, the term of this patent is extended or adjusted under 35 U.S.C. 154(b) by 192 days.

(21) Appl. No.: 17/764,943

(22) PCT Filed: Aug. 28, 2020

(86) PCT No.: PCT/JP2020/032517
§ 371 (c)(1),
(2) Date: Mar. 29, 2022

(87) PCT Pub. No.: WO2021/065269
PCT Pub. Date: Apr. 8, 2021

(65) Prior Publication Data
US 2022/0362920 A1    Nov. 17, 2022

(30) Foreign Application Priority Data

Sep. 30, 2019    (JP) ................. 2019-179572

(51) Int. Cl.
*B25F 5/02*    (2006.01)
*H01M 10/05*    (2010.01)
(Continued)

(52) U.S. Cl.
CPC .............. *B25F 5/02* (2013.01); *H01M 10/05* (2013.01); *H01M 50/209* (2021.01);
(Continued)

(58) Field of Classification Search
CPC .. B25F 5/02; B25F 5/00; B25F 5/006; H01M 10/48; H01M 2220/30; H01M 50/213; H01M 50/247
(Continued)

(56) References Cited

U.S. PATENT DOCUMENTS

2011/0005793 A1    1/2011    Hanawa et al.
2012/0267135 A1    10/2012    Roser
(Continued)

FOREIGN PATENT DOCUMENTS

CN    104054205 A    9/2014
EP    2062310 B1    5/2009
(Continued)

OTHER PUBLICATIONS

Extended European Search Report dated Oct. 19, 2022 issued for the corresponding European Application No. 20870845.3.
(Continued)

*Primary Examiner* — Jacob A Smith
(74) *Attorney, Agent, or Firm* — Rimon P.C.

(57) ABSTRACT

An electric tool includes a body portion, a grip portion, and a battery pack. The body portion includes: a tool attachment member to which a tool is attached; a driving unit to drive the tool; and a transmission unit to transmit driving force of the driving unit to the tool. The grip portion is provided for the body portion and includes a gripping part to be held by a user with his or her hand. The battery pack supplies power to the driving unit. The battery pack includes an all-solid-state battery.

14 Claims, 10 Drawing Sheets

(51) Int. Cl.
    *H01M 50/209*     (2021.01)
    *H01M 50/247*     (2021.01)
    *H01M 50/256*     (2021.01)
    *H02J 7/00*     (2006.01)

(52) U.S. Cl.
    CPC ....... *H01M 50/247* (2021.01); *H01M 50/256* (2021.01); *H02J 7/0045* (2013.01); *H02J 7/0063* (2013.01); *H01M 2220/30* (2013.01)

(58) Field of Classification Search
    USPC .......................................................... 173/217
    See application file for complete search history.

(56) References Cited

U.S. PATENT DOCUMENTS

| | | |
|---|---|---|
| 2014/0272507 A1 | 9/2014 | Ku et al. |
| 2017/0229733 A1 | 8/2017 | Ohwada et al. |
| 2017/0326720 A1 | 11/2017 | Kuroyanagi et al. |
| 2019/0252728 A1 | 8/2019 | Shimizu et al. |
| 2020/0395641 A1 * | 12/2020 | Suzuki ............... H01M 10/052 |
| 2020/0398416 A1 | 12/2020 | Matei et al. |
| 2022/0102772 A1 | 3/2022 | Suzuki et al. |
| 2022/0109217 A1 | 4/2022 | Dong et al. |

FOREIGN PATENT DOCUMENTS

| | | | | |
|---|---|---|---|---|
| JP | 2005-169532 A | | 6/2005 | |
| JP | 2017-147028 A | | 8/2017 | |
| JP | 2018-183874 A | | 11/2018 | |
| JP | 2018183874 A | * | 11/2018 | ............. B25B 21/00 |
| WO | WO-2018203474 A1 | * | 11/2018 | ........ H01M 10/0525 |
| WO | 2019/013032 A1 | | 1/2019 | |
| WO | WO-2019013032 A1 | * | 1/2019 | ............ H01M 50/20 |

OTHER PUBLICATIONS

Extended European Search Report dated Oct. 19, 2022 issued for the related European Application No. 20871664.7.

International Search Report dated Sep. 29, 2020 issued in International Patent Application No. PCT/JP2020/032516, with English translation.

International Search Report dated Sep. 29, 2020 issued in International Patent Application No. PCT/JP2020/032517, with English translation.

International Search Report dated Sep. 29, 2020 issued in International Patent Application No. PCT/JP2020/032518, with English translation.

Chinese Office Action issued in corresponding Chinese Patent Application No. 202080065326.6, dated Mar. 2, 2023, with English translation of Search Report.

Non-final Office Action issued in corresponding U.S. Appl. No. 17/764,951, dated Dec. 21, 2023.

Non-final Office Action issued in corresponding U.S. Appl. No. 17/764,955, dated Jan. 16, 2024.

* cited by examiner

ELECTRIC TOOL AND BATTERY PACK

CROSS-REFERENCE OF RELATED APPLICATIONS

This application is the U.S. National Phase under 35 U.S.C. § 371 of International Patent Application No. PCT/JP2020/032517, filed on Aug. 28, 2020, which in turn claims the benefit of Japanese Patent Application No. 2019-179572, filed on Sep. 30, 2019, the entire disclosures of which Applications are incorporated by reference herein.

TECHNICAL FIELD

The present disclosure generally relates to an electric tool and a battery pack, and more particularly relates to an electric tool powered by a battery and a battery pack.

BACKGROUND ART

Patent Literature 1 discloses a rotary tool as a type of electric tool. The housing of this rotary tool is made up of: a cylinder portion that houses a motor and a driving unit to be driven in rotation by the motor; and a grip portion provided to protrude from the cylinder portion. A battery pack serving as a power supply for the rotary tool is attached to the grip portion.

If the battery pack includes a liquid battery such as a lithium-ion battery, then application of impact to the battery pack could cause leakage of liquid from the liquid battery.

CITATION LIST

Patent Literature

Patent Literature 1: JP 2005-169532 A

SUMMARY OF INVENTION

An object of the present disclosure is to provide an electric tool that may reduce the chances of causing a malfunction to its battery pack and such a battery pack.

An electric tool according to an aspect of the present disclosure includes a body portion, a grip portion, and a battery pack. The body portion includes: a tool attachment member to which a tool is attached; a driving unit to drive the tool; and a transmission unit to transmit driving force of the driving unit to the tool. The grip portion is provided for the body portion and includes a gripping part to be held by a user with his or her hand. The battery pack supplies power to the driving unit. The battery pack includes an all-solid-state battery.

A battery pack according to another aspect of the present disclosure is designed for use in the electric tool described above and includes a battery case to house the all-solid-state battery.

DESCRIPTION OF EMBODIMENTS

Embodiment

(1) Overview

Figure 1:
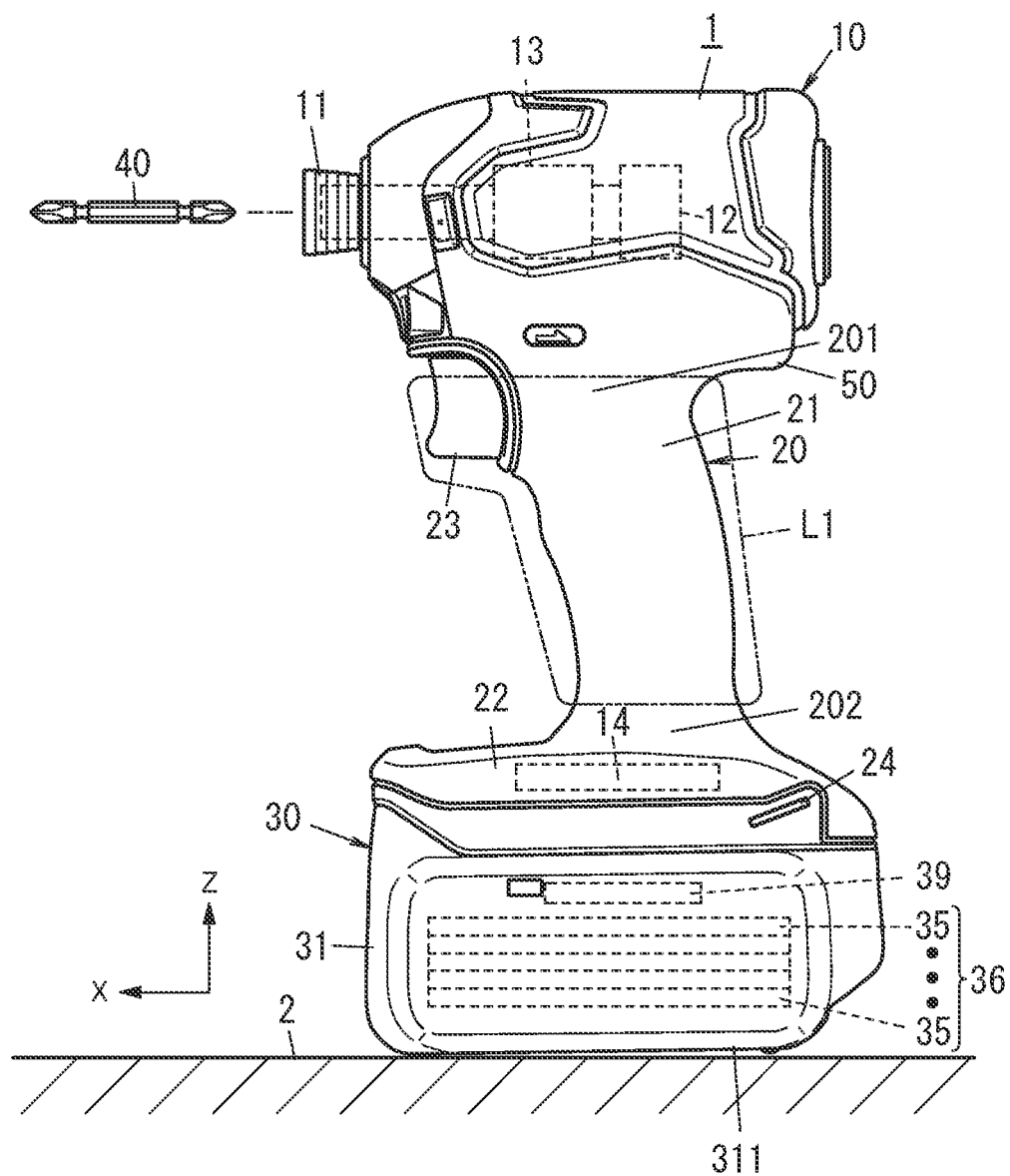
FIG. 1 is a side view of an electric tool according to an exemplary embodiment of the present disclosure.
Figure 2:
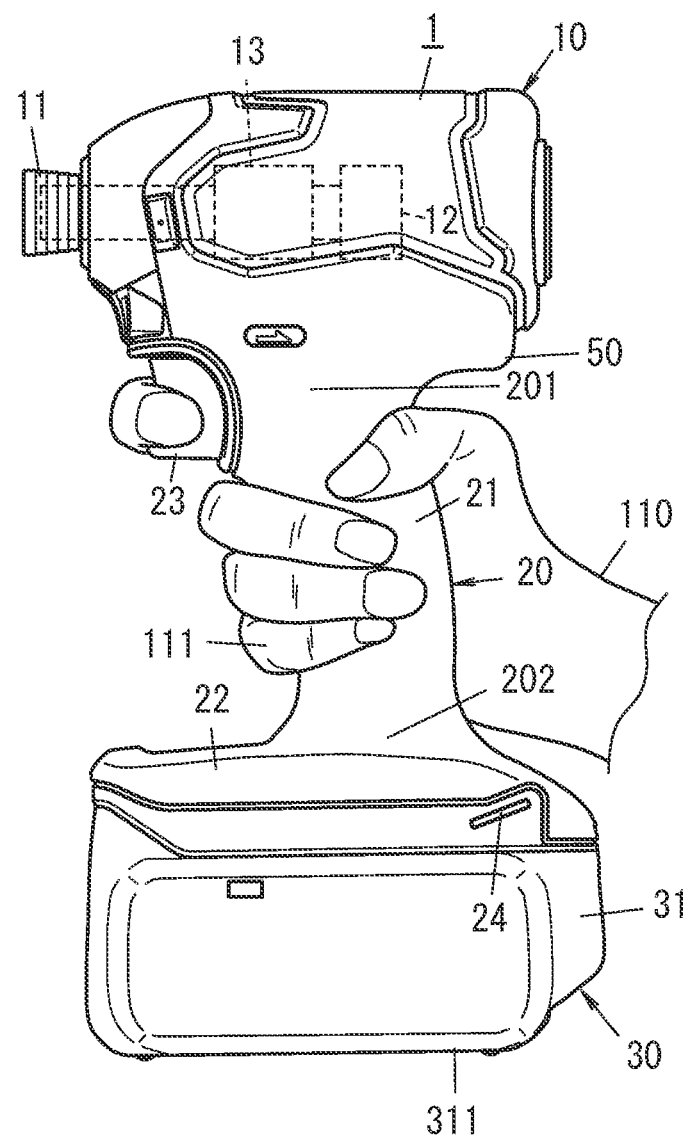
FIG. 2 illustrates a state where the electric tool is used.
Figure 3:
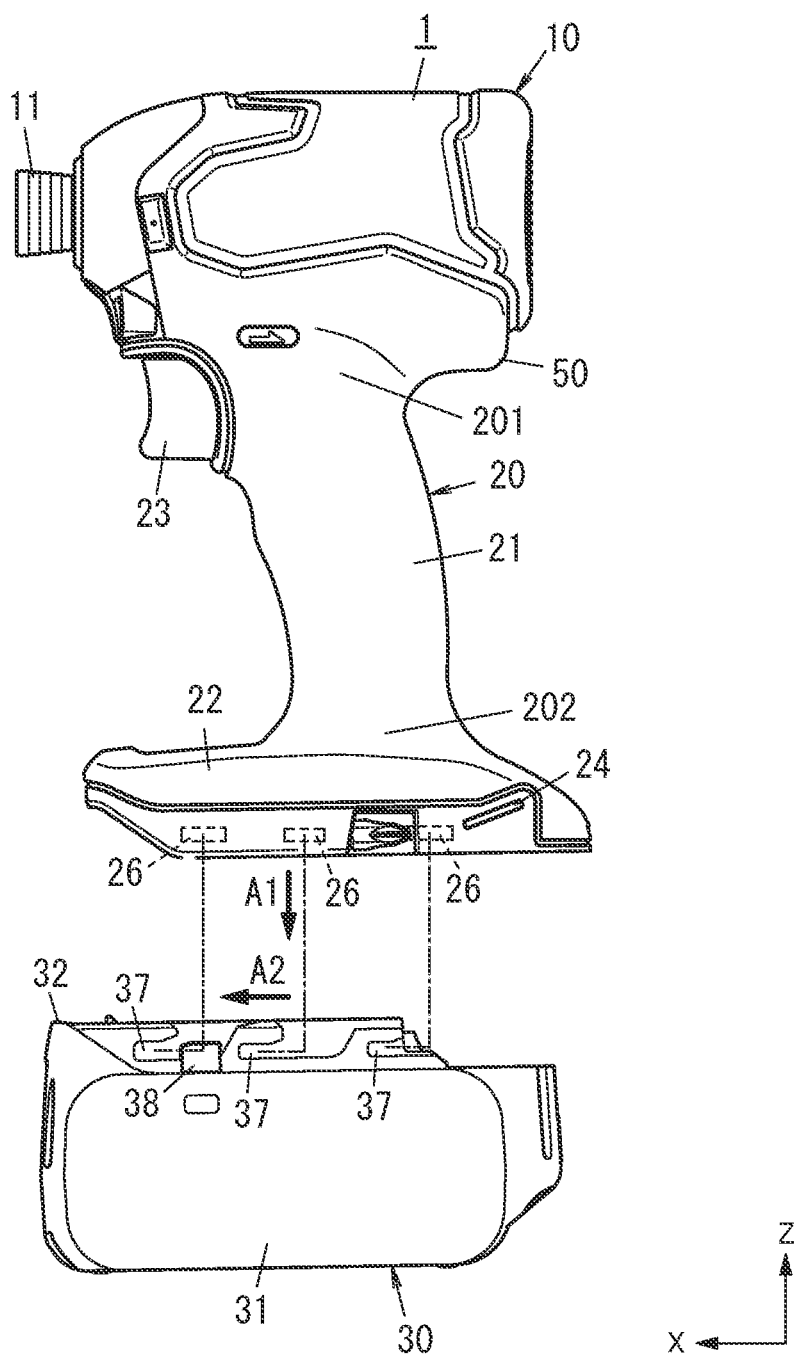
FIG. 3 is a side view illustrating a state where a battery pack is yet to be attached to a grip portion of the electric tool.
Figure 4:
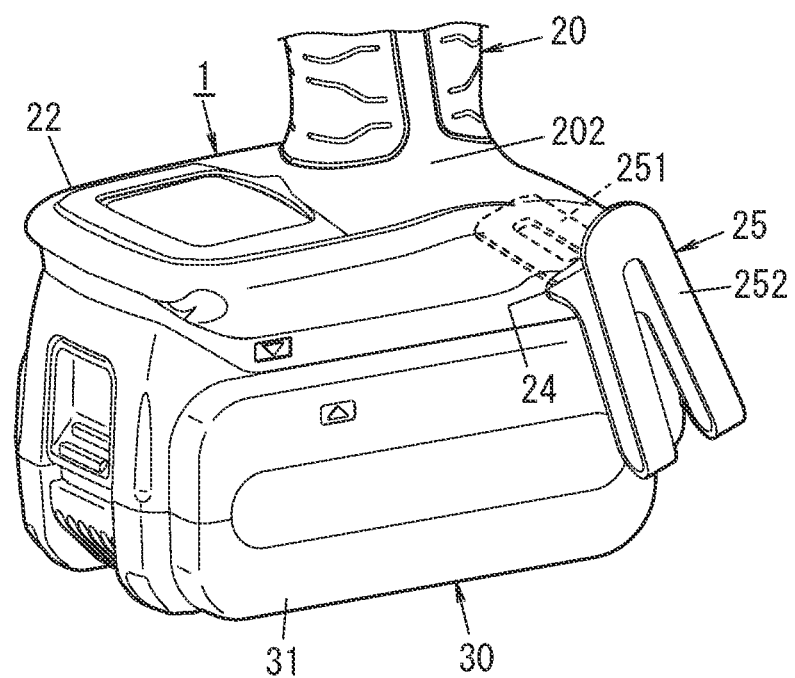
FIG. 4 is a perspective view of a main part of the electric tool.

An electric tool 1 according to an exemplary embodiment is a handheld electric tool as shown in FIGS. 1-3. The electric tool 1 may be implemented as, for example, an electric screwdriver, an electric drill, an electric wrench, or an electric grinder.

The electric tool 1 according to this embodiment includes a body portion 10, a grip portion 20, and a battery pack 30.

The body portion 10 includes: a tool attachment member 11 to which a tool 40 is attached; a driving unit 12 to drive the tool 40; and a transmission unit 13 to transmit the driving force of the driving unit 12 to the tool 40.

The grip portion 20 is provided for the body portion 10 and includes a gripping part 21 designed to be held by a user 100 with his or her hand 110.

The battery pack 30 supplies power to the driving unit 12. The battery pack 30 includes an all-solid-state battery 35.

The all-solid-state battery 35 is a battery in which a solid electrolyte is in charge of conduction of ions between its anode and cathode. Using the all-solid-state battery 35 reduces the chances of causing leakage of the electrolyte, compared to using a liquid battery. Consequently, an electric tool 1 that may reduce the chances of causing a malfunction to the battery pack 30 may be provided. In the following description of this exemplary embodiment, an electric tool 1 of the shape in which out of two end portions 201, 202, interposing the gripping part 21 between them, of the grip portion 20, one end portion 201 is connected to the body portion 10 and the battery pack 30 is attached to the other end portion 202 (i.e., a so-called "gun type" electric tool 1) will be described.

The battery pack 30 provided for the electric tool 1 includes a battery case 31 to house the all-solid-state battery 35 therein.

The battery pack 30 includes the all-solid-state battery 35, thus providing a battery pack 30 which may reduce the chances of causing leakage of the electrolyte and thereby reduce the chances of causing a malfunction to itself, compared to a situation where the battery pack 30 includes a liquid battery.

(2) Details

Next, the configuration of an electric tool according to an exemplary embodiment will be described in detail with reference to FIGS. 1-7. Note that the numerical values, shapes, materials, positions of constituent elements, relative positions between the constituent elements, their connection, and other specifics to be described below are all examples and should not be construed as limiting the scope of the present disclosure. The drawings to be referred to in the following description of embodiments are all schematic representations. That is to say, the ratio of the dimensions (including thicknesses) of respective constituent elements illustrated on the drawings does not always reflect their actual dimensional ratio. Also, in the following description, the X-axis direction and Z-axis direction shown in FIGS. 1, 3, and 6 will define the forward/backward direction and upward/downward direction, respectively, and the Y-axis direction shown in FIG. 6 will define the rightward/leftward direction. More specifically, the positive X-axis direction will define the forward direction, the positive Y-axis direction will define the rightward direction, and the positive Z-axis direction will define the upward direction. However, these directions are only examples and should not be construed as limiting the direction in which the electric tool 1 is used. Furthermore, the arrows shown on the drawings to indicate the respective directions are just given there as an assistant to description and are insubstantial ones.

The electric tool 1 includes the body portion 10, the grip portion 20, and the battery pack 30 as shown in FIGS. 1-7. In this embodiment, the body portion 10 and the grip portion 20 are provided integrally with each other and a tool body 50 is made up of the body portion 10 and the grip portion 20.

(2.1) Tool Body

First, the tool body 50 made up of the body portion 10 and the grip portion 20 will be described.

The body portion 10 may be, for example, a molded product of a synthetic resin with electrical insulation properties. The body portion 10 is formed in the shape of a cylinder extending in the forward/backward direction.

At the frontend of the body portion 10, provided is the tool attachment member 11, to which a tool 40 such as a tip tool is attached. Inside the body portion 10, housed are the driving unit 12 and the transmission unit 13 described above.

The tool attachment member 11 is provided for the body portion 10 to be rotatable around a rotational axis aligned with the forward/backward direction. Multiple different types of tools 40 are provided for various types of machining work to be done using this electric tool 1. Any desired one of the tools 40 may be selectively attached to the tool attachment member 11 and used to have an intended type of machining work done. Examples of such types of tools 40 include a screwdriver bit for fastening a screw, a drill bit for drilling a hole, and a socket for fastening a nut.

The driving unit 12 includes an electric motor to be driven with the electric power supplied from the battery pack 30.

The transmission unit 13 transmits the driving force of the driving unit 12 to the tool attachment member 11. The transmission unit 13 is coupled to an output shaft of the driving unit 12 and transmits the rotational force of the driving unit 12 to the tool attachment member 11, thereby rotating the tool attachment member 11. Optionally, the transmission unit 13 may include a speed reducer mechanism, a clutch mechanism, and an impact mechanism, for example.

The grip portion 20 extends downward from a part of the peripheral surface of the body portion 10. The longitudinal axis of the grip portion 20 is aligned with the upward/downward direction. At the middle of the grip portion 20 in the upward/downward direction (at the middle of its length), provided is the gripping part 21 to be held by the user with his or her hand 110 (see FIG. 2). The part surrounded with the two-dot chain L1 (see FIG. 1) of the grip portion 20 is the gripping part 21. The grip portion 20 includes two end portions 201, 202, the upper one 201 of which is located opposite from the lower one 202 with respect to the gripping part 21. The upper end portion 201 is connected to the body portion 10. At the lower end portion 202, provided is a battery attachment portion 22 to which the battery pack 30 is attached.

A trigger 23 is provided on a front portion of the gripping part 21 of the grip portion 20 to be located adjacent to the end portion 201 connected to the body portion 10. The trigger 23 is an operating member that accepts an operating command entered by the user to control the rotation of the driving unit 12. The trigger 23 is operated by the user with the index finger, for example, of his or her hand 110 holding the grip portion 20.

The battery attachment portion 22 is provided integrally with the lower end portion 202 of the grip portion 20. The battery attachment portion 22 is formed to protrude perpendicularly to the upward/downward direction from the lower end portion 202 of the grip portion 20. The battery attachment portion 22 is formed in the shape of a box, of which the dimension in the upward/downward direction is smaller than its dimension in the forward/backward direction and its dimension in the rightward/leftward direction. To the bottom of the battery attachment portion 22, the battery pack 30 is attached removably. The lower surface of the battery attachment portion 22 is provided with a recess into which an upper portion of the battery pack 30 is inserted.

In this embodiment, a control unit 14 (see FIG. 1), including a circuit board on which a circuit for controlling the driving unit 12 and other components are mounted, is housed inside the battery attachment portion 22. In response to the operation of pulling the trigger 23, the control unit 14 may switch the ON/OFF states of the driving unit 12. In addition, according to the manipulative variable of the operation of pulling the trigger 23 (i.e., depending on how deep the trigger 23 has been pulled), the control unit 14 also controls the rotational velocity of the driving unit 12 (i.e., the rotational velocity of the tool 40 attached to the tool attachment member 11).

In addition, a suspension fitting 25 (see FIG. 4) for use to suspend the electric tool 1 from, for example, a working belt 120 (see FIG. 5) of the user 100 of the electric tool 1 is attached to the battery attachment portion 22. The suspension fitting 25 includes a fixing portion 251 to be inserted into a hole 24 provided through a side surface of the battery attachment portion 22 and fixed thereto with a screw, for example, and a U-hook 252, one end portion of which is coupled to the fixing portion 251. Hooking the hook 252 on his or her working belt 120, for example, allows the user 100 to move or do some type of work other than the machining work that requires the use of the electric tool 1, while suspending the electric tool 1 from the working belt 120.

That is to say, in this embodiment, out of the two end portions 201, 202, interposing the gripping part 21 between themselves, of the grip portion 20, the body portion 10 is connected to one end portion 201 and the battery pack 30 is attached to the other end portion 202. The suspension fitting 25 for use to suspend the electric tool 1 from an object is attached to the end portion 202, to which the battery pack 30 is attached, of the grip portion 20. In this embodiment, the respective weights of the body portion 10 and the battery pack 30 are set such that the battery pack 30 is heavier than the body portion 10. Since the battery pack 30 is heavier than the body portion 10, the center of mass of the electric tool 1 is located in a part, proximate to the battery pack 30, of the grip portion 20. The suspension fitting 25 is attached to the end portion 202, to which the battery pack 30 is attached, of the grip portion 20, thus allowing the electric tool 1 to be suspended from a position close to the center of mass of the electric tool 1. This may reduce, while the user 100 is moving or doing some other type of work with the electric tool 1 suspended from a working belt 120, the chances of the electric tool 1 being shaken significantly around the suspension fitting 25. This may reduce the chances of the electric tool 1 suspended obstructing the user's 100 movement or doing some other type of work.

Figure 5:
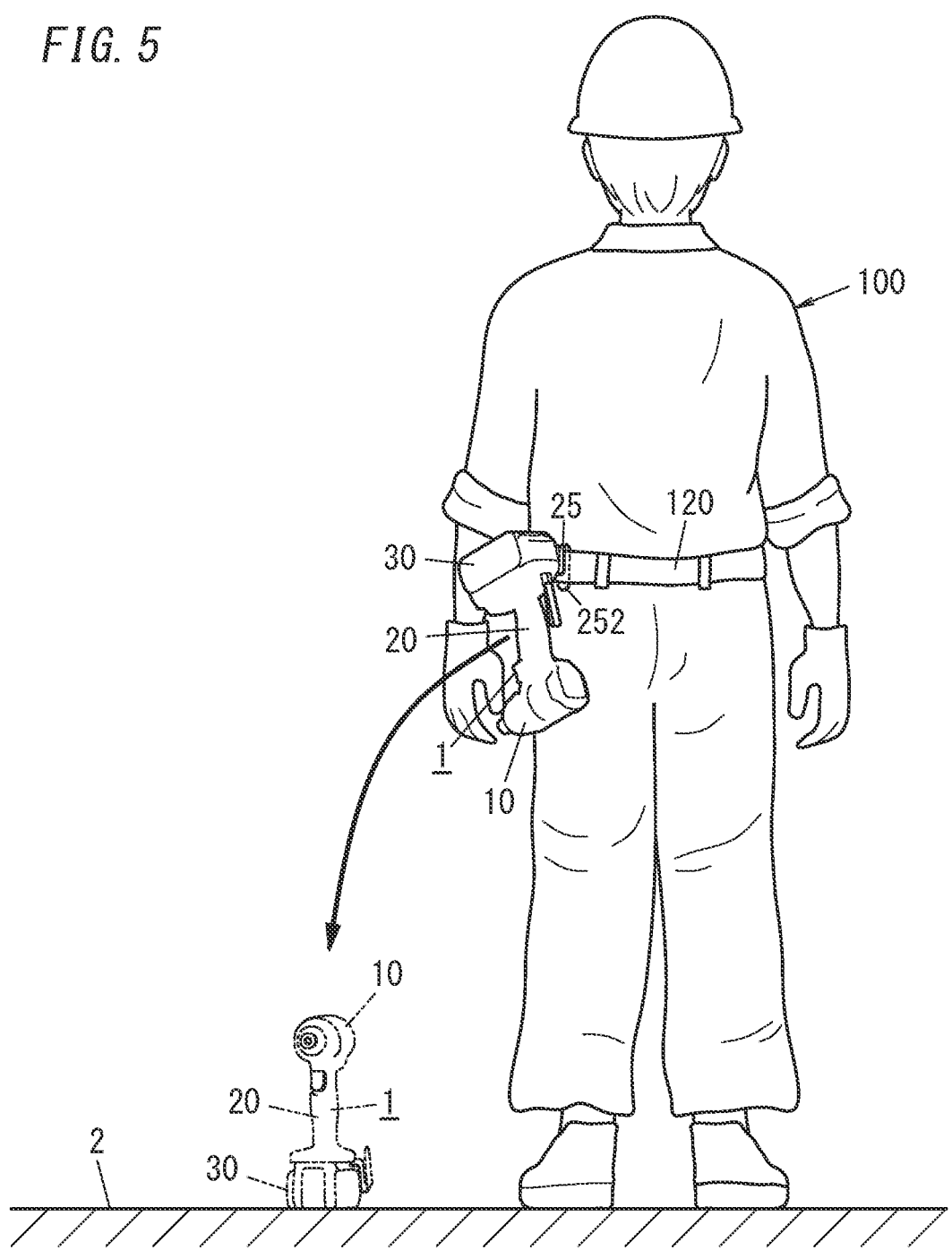
FIG. 5 illustrates a state where the electric tool is used.

In addition, even if the suspension fitting 25 comes loose from the working belt 120 to let the electric tool 1 fall while the electric tool 1 is suspended from the working belt 120 as shown in FIG. 5, the electric tool 1 will hit the ground with the battery pack 30, which is heavier than the body portion 10, facing down. That is to say, the battery pack 30 of the electric tool 1 will hit the ground 2 earlier than the body portion 10 thereof, thus allowing the battery pack 30 to receive the impact caused by the fall. This may reduce the impact applied to the driving unit 12 and the transmission unit 13. Consequently, this achieves the advantage of reducing the frequency of occurrence of failures caused in the driving unit 12 and the transmission unit 13.

In this embodiment, the suspension fitting 25 is provided for the grip portion 20. Alternatively, the suspension fitting 25 may be attached to the body portion 10. That is to say, the electric tool 1 may further include the suspension fitting 25 which is attached to at least one of the body portion 10 or the grip portion 20 to suspend the electric tool 1 from an object. This allows the electric tool 1 to be held suspended from the object.

(2.2) Battery Pack

The battery pack 30 serving as a power supply for the electric tool 1 will be described with reference to FIGS. 1-7.

The battery pack 30 serves as a power supply that allows the electric tool 1 to operate. The battery pack 30 includes the power storage unit 36 including the all-solid-state batteries 35 and the battery case 31 to house the power storage unit 36 therein. The battery case 31 is a molded product of a synthetic resin having electrical insulation properties and is formed in the shape of a box.

Figure 6:
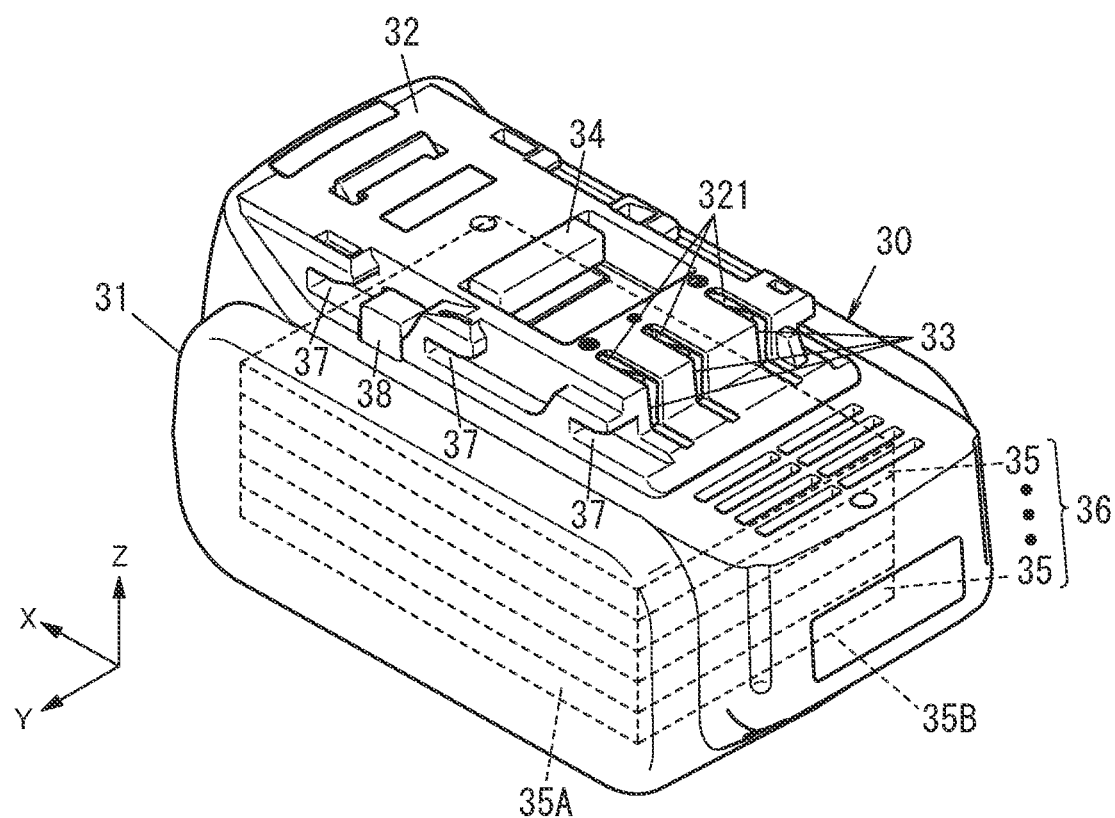
FIG. 6 is a perspective view of a battery pack included in the electric tool.

In the upper part of the battery case 31, a rectangular parallelepiped fitting portion 32, which is raised by one step with respect to right and left side portions, is provided along a centerline in the rightward/leftward direction as shown in FIG. 6. At the frontend of the fitting portion 32, three slits 321 are provided to be spaced apart from each other in the rightward/leftward direction. Each slit 321 is provided through the front and upper surfaces of the fitting portion 32 and extends in the forward/backward direction. Inside each slit 321, provided is a connection terminal portion 33 to be electrically connected to a feeder connection terminal provided in a lower part of the grip portion 20. Each connection terminal portion 33 is electrically connected to the power storage unit 36 housed inside the battery case 31. In addition, on the upper surface of the fitting portion 32, provided is a second connector 34 to be electrically connected to a first connector for transmitting signals, which is provided in a lower part of the grip portion 20. The second connector 34 is electrically connected to, for example, a circuit board 39 (see FIG. 1) housed inside the battery case 31. The circuit board 39 acquires battery information about the battery pack 30 (such as the voltage value and temperature of the power storage unit 36) and outputs the battery information to the control unit 14 provided inside the battery attachment portion 22. Furthermore, the right and left side surfaces of the fitting portion 32 have a plurality of insert grooves 37, to which a plurality of hook pieces 26 (see FIG. 4) provided inside a recess on the lower surface of the battery attachment portion 22 are respectively inserted.

In this embodiment, to attach the battery pack 30 to the battery attachment portion 22, the tool body 50 is moved downward (as indicated by the arrow A1 in FIG. 3) from over the battery pack 30 as shown in FIG. 3, thereby inserting the fitting portion 32 of the battery pack 30 into the recess on the lower surface of the battery attachment portion 22. Thereafter, sliding the tool body 50 forward (as indicated by the arrow A2 in FIG. 3) with respect to the battery pack 30 allows the hook pieces 26 of the battery attachment portion 22 to be inserted into the insert grooves 37. A lock piece 38 is disposed behind the frontmost one of the plurality of insert grooves 37. The lock piece 38 is biased upward by an elastic member such as a spring. When the battery pack 30 is attached to the battery attachment portion 22, the lock piece 38 is pressed downward by the hook piece 26, thus allowing the hook piece 26 to move inside the insert groove 37. Thereafter, when the hook piece 26 reaches the deepest part of the insert groove 37, the lock piece 38 is pressed by the spring to move upward and reach the vicinity of the rear opening of the insert groove 37. As a result, attempting to slide the tool body 50 backward with respect to the battery pack 30 brings the hook piece 26 inserted into the front insert groove 37 into contact with the lock piece 38, thus regulating the backward slide of the tool body 50. This allows the battery pack 30 to be kept attached to the battery attachment portion 22.

In a state where the battery pack 30 is attached to the battery attachment portion 22, the connection terminal portion 33 is electrically connected to the connection terminals of the battery attachment portion 22 and power required for operation is supplied from the power storage unit 36 to the control unit 14, the driving unit 12, and other components. In addition, the second connector 34 is electrically connected to the first connector of the battery attachment portion 22, the circuit board 39 housed in the battery case 31 and the control unit 14 are also electrically connected to each other, and the battery information is output from the circuit board 39 to the control unit 14.

On the other hand, to remove the battery pack 30 from the battery attachment portion 22, an operating member provided for the battery case 31 is operated to move the lock piece 38 downward and make the hook pieces 26 ready to move out of the insert grooves 37. In this state, the tool body 50 is slid backward (i.e., in the direction opposite from the one indicated by the arrow A2 in FIG. 3) with respect to the battery pack 30 to move the hook pieces 26 out of the insert grooves 37. Then, moving the tool body 50 upward (i.e., in the direction opposite from the one indicated by the arrow A1 in FIG. 3) with respect to the battery pack 30 allows the battery pack 30 to be removed from the tool body 50.

As can be seen, according to this embodiment, the battery pack 30 is attachable to, and removable from, the grip portion 20 (of the tool body 50). Thus, when the battery level of the battery pack 30 becomes low, the user just needs to remove the battery pack 30 from the grip portion 20 and attach a charged battery pack 30 as a replacement to the grip portion 20. This allows the user to continue his or her machining work using the electric tool 1.

Furthermore, the battery pack 30 is attached to the end portion 202 of the grip portion 20 which is located adjacent to the little finger 111 of the user 100 who grips the grip portion 20 as shown in FIG. 2. Thus, the end portion 201, located adjacent to the thumb of the user 100, of the grip portion 20 is connected to the body portion 10, thus achieving the advantage of allowing the user 100 to focus on the target more easily with his or her eyes while he or she is doing machining work with the tool 40 brought into contact with the workpiece.

Note that in this embodiment, the respective weights of the battery pack 30 and the body portion 10 are set such that the battery pack 30 is heavier than the body portion 10. The battery pack 30 may be made heavier than the body portion 10 by increasing the weight of the power storage unit 36 by increasing the number of the all-solid-state batteries 35 included in the power storage unit 36, for example. Alternatively, the battery pack 30 may be made heavier than the body portion 10 by reducing the weight of the body portion 10 with either the driving unit 12 or the transmission unit 13 made lighter in weight. In this embodiment, the power storage unit 36 is made up of all-solid-state batteries 35, each of which is lighter in weight than a liquid battery such as a lithium-ion battery. The battery pack 30 may be made heavier than the body portion 10 by either increasing the number of the all-solid-state batteries 35 or increasing the size of each of the all-solid-state batteries 35.

The power storage unit 36 is made up of a plurality of all-solid-state batteries 35, each of which is formed in a sheet shape as shown in FIGS. 1 and 6. The plurality of all-solid-state batteries 35 are connected in either series or parallel according to the voltage or capacity required. In this embodiment, the power storage unit 36 includes five all-solid-state batteries 35 which are connected together in series. However, the number and connection mode (which is either series or parallel) of the all-solid-state batteries 35 that form the power storage unit 36 may be changed as appropriate according to the voltage or capacity required.

As described above, out of the two end portions 201, 202, interposing the gripping part 21 between them, of the grip portion 20, the body portion 10 is connected to one end portion 201 and the battery pack 30 is attached to the other end portion 202. The electric tool 1 of this type may stand by itself in its entirety (i.e., including the body portion 10, grip portion 20, and battery pack 30 thereof) with the bottom surface 311, opposite from the grip portion 20, of the battery pack 30 put on the ground 2 (mounting surface) as shown in FIG. 1. The battery pack 30 includes the connection terminal portion 33 to be electrically connected to the driving unit 12 when the battery pack 30 is attached to the grip portion 20 and the power storage unit 36 electrically connected to the connection terminal portion 33. The power storage unit 36 includes a plurality of all-solid-state batteries 35, each of which is formed in a sheet shape, and which are stacked one on top of another. In this case, if impact force is applied to the power storage unit 36 perpendicularly to the direction in which the all-solid-state batteries 35 are stacked one on top of another, then peeling or misalignment will occur between the plurality of all-solid-state batteries 35 that are stacked one on top of another, thus possibly causing instability in electrical connection between the plurality of all-solid-state batteries 35. On the other hand, if impact force is applied to the power storage unit 36 in the direction in which the all-solid-state batteries 35 are stacked one on top of another, then peeling or misalignment will rarely occur between the plurality of all-solid-state batteries 35 that are stacked one on top of another, thus reducing the chances of causing instability in electrical connection between the plurality of all-solid-state batteries 35. In this embodiment, the direction in which the plurality of all-solid-state batteries 35 are stacked one on top of another is aligned with the line that connects together the two end portions 201, 202, interposing the gripping part 21 between them, of the grip portion 20 (i.e., the Z-axis direction). This reduces the damage to be done to the power storage unit 36 by the impact applied to the power storage unit 36 in the direction aligned with the Z-axis direction.

Furthermore, in this embodiment, the direction in which the plurality of all-solid-state batteries 35 are stacked one on top of another is aligned with a direction perpendicular to the bottom surface 311 of the battery pack 30. As used herein, the "direction perpendicular to the bottom surface 311" refers to the direction perpendicular to the mounting surface (e.g., the ground surface 2) on which the electric tool 1 is mounted (i.e., the upward/downward direction) and is the Z-axis direction shown in FIG. 1. Therefore, if the electric tool 1 is put with impetus onto the mounting surface, then impact force is applied in the direction in which the plurality of all-solid-state batteries 35 are stacked one on top of another, thus reducing the chances of causing peeling or misalignment between the plurality of all-solid-state batteries 35 that are stacked one on top of another. This may reduce the chances of causing deterioration in the electrical performance of the battery pack 30.

Figure 7:
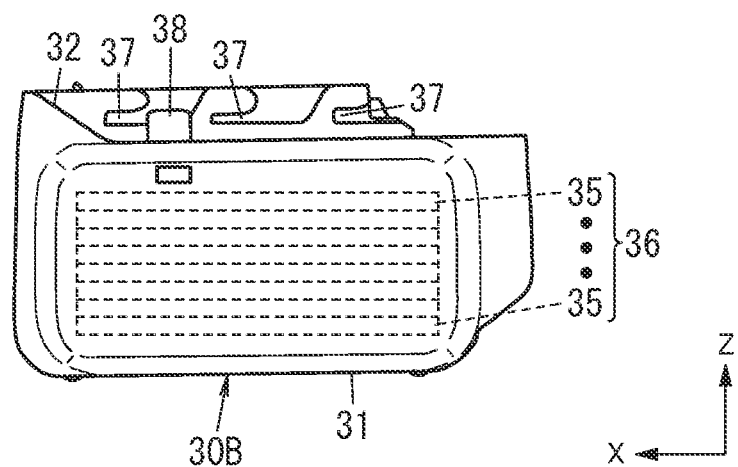
FIG. 7 is a side view of another battery pack included in the electric tool.

Also, in this battery pack 30, the number, area, and connection mode of the all-solid-state batteries 35 that form the power storage unit 36 may be changed as appropriate according to the voltage and capacity required. The voltage value of the power storage unit 36 depends on, for example, the voltage values of the respective all-solid-state batteries 35 and the number of the all-solid-state batteries 35 that are connected together in series. The capacity of the power storage unit 36 depends on, for example, the respective areas of the all-solid-state batteries 35 and the number of the all-solid-state batteries 35 that are connected together in parallel. For example, FIG. 7 is a side view of a battery pack 30B including a power storage unit 36 in which eight all-solid-state batteries 35 are connected together in series. In this battery pack 30B, a larger number of all-solid-state batteries 35 are connected together in series than in the battery pack 30 described above, and therefore, the voltage when the battery pack 30B is fully charged is set at a higher voltage than in the battery pack 30. Note that the number of the battery packs of different types does not have to be two. Rather, multiple different types of battery packs 30, of which respective voltage values and/or capacities are different from each other, are suitably prepared. In that case, one battery pack 30, selected from the multiple different types of battery packs 30, may be attached to the grip portion 20 (of the tool body 50). This allows the electric tool 1 to be used with a battery pack 30 with any desired voltage value or capacity attached to the grip portion 20.

Furthermore, each of the plurality of all-solid-state batteries 35 has a rectangular sheet shape. As shown in FIG. 6, the longitudinal axis of the plurality of all-solid-state batteries 35 is aligned with the orientation of the tool 40 attached to the tool attachment member 11 (i.e., the forward/backward direction in this embodiment). That is to say, the plurality of all-solid-state batteries 35 are arranged such that their longer side 35A is aligned with the X-axis direction and their shorter side 35B is aligned with the Y-axis direction. This enables reducing, compared to a situation where the plurality of all-solid-state batteries 35 are arranged such that their longer side 35A is perpendicular to the orientation of the tool 40 (i.e., the forward/backward direction), the width of the battery pack 30 as measured perpendicularly to the orientation of the tool 40 with the tool 40 pointed at the workpiece.

(2.3) Method of Use

The electric tool 1 according to this embodiment is made usable by attaching the battery pack 30 to the battery attachment portion 22 of the grip portion 20. Note that a tool 40 suitable for the type of the machining work that the user 100 is going to do is attached by the user 100 to the tool attachment member 11.

When the user 100 has not pulled the trigger 23 yet, the control unit 14 keeps the driving unit 12 deactivated and does not rotate the tool attachment member 11.

On the other hand, when the user 100 pulls the trigger 23, the control unit 14 starts driving the driving unit 12 in rotation, thereby turning the tool 40 attached to the tool attachment member 11. At this time, the control unit 14 controls, based on the manipulative variable of the operation of pulling the trigger 23, the rotational velocity of the driving unit 12 (i.e., the rotational velocity of the tool attachment member 11). This allows the user 100 to have any desired type of machining work done using the electric tool 1 by performing the operation of pulling the trigger 23.

(3) Variations

Next, variations of the exemplary embodiment described above will be enumerated one after another. Note that the variations to be described below may be adopted in combination as appropriate.

Figure 8:
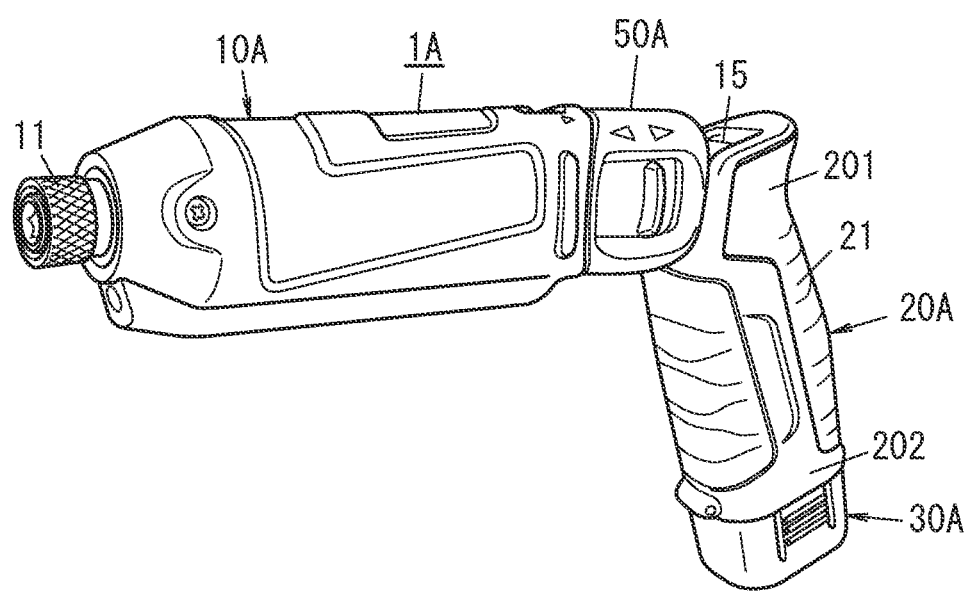
FIG. 8 is a perspective view of an electric tool according to a variation of the exemplary embodiment of the present disclosure.
Figure 9:
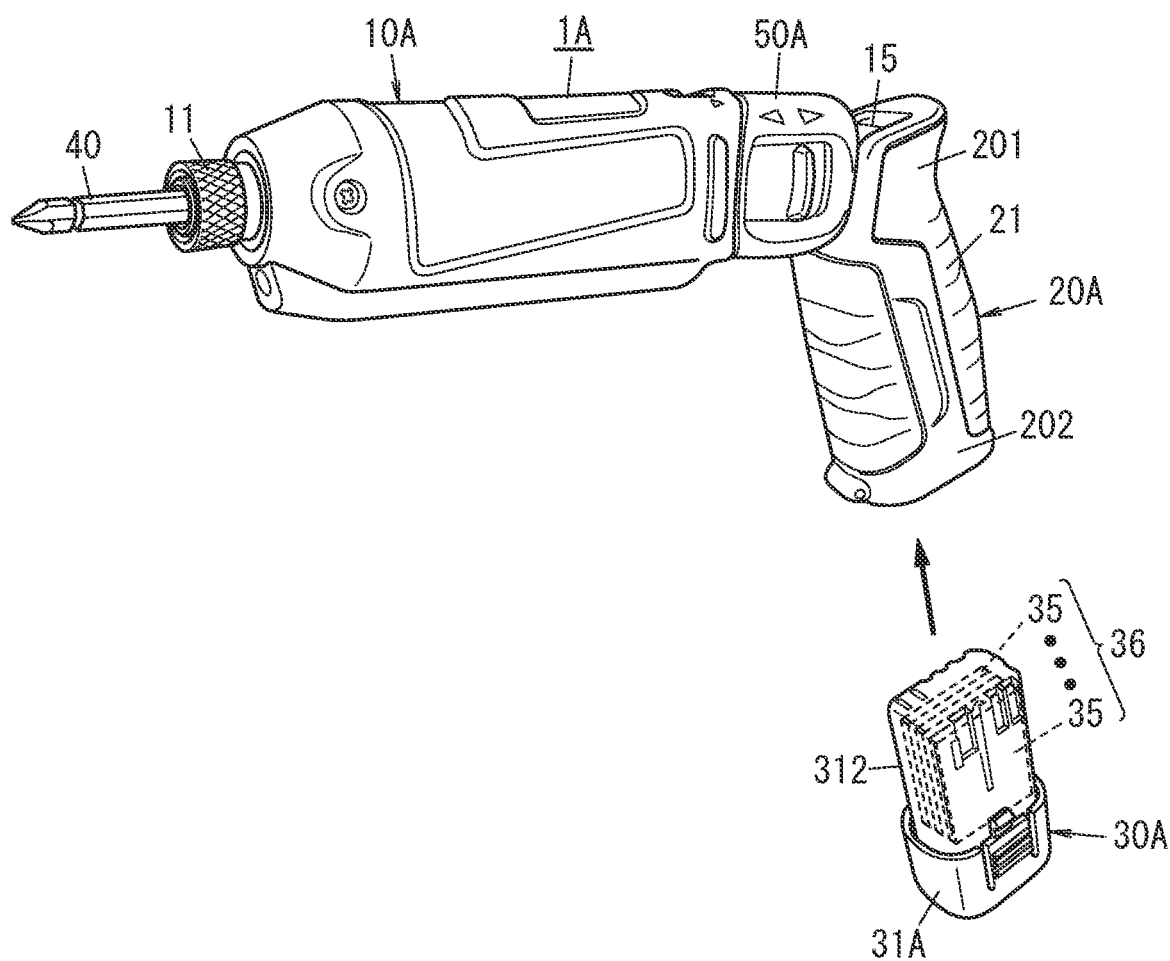
FIG. 9 is a perspective view illustrating a state where a battery pack is yet to be attached to a grip portion of the electric tool.
Figure 10:
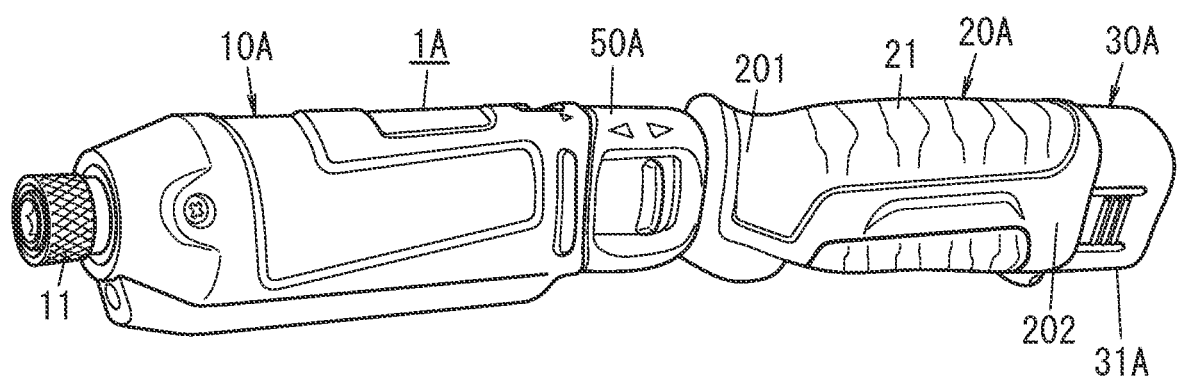
FIG. 10 is a perspective view illustrating a state where the electric tool has been changed into a straight shape.

The electric tool 1 according to the exemplary embodiment described above is a so-called "gun type" electric tool. However, this is only an example and should not be construed as limiting. Alternatively, the present disclosure may also be implemented as a stick-type electric tool 1A as shown in FIGS. 8-10. In the following description, any constituent element of the stick-type electric tool 1A, having the same function as a counterpart of the gun-type electric tool 1 described above, will be designated by the same reference numeral as that counterpart's, and illustration and description thereof will be omitted herein.

In the stick-type electric tool 1A, a cylindrical body portion 10A including the tool attachment member 11 at the tip and a grip portion 20A including the gripping part 21 are coupled to each other via a hinge portion 15. In this variation, a tool body 50A is formed by the body portion 10A and the grip portion 20A and the battery pack 30A is attached to the tool body 50A.

The grip portion 20A is configured to be rotatable around the hinge portion 15 with respect to the body portion 10A. This allows the user to use the electric tool 1A selectively either in the shape in which the body portion 10A and the grip portion 20A are extended in straight line (see FIG. 10) or in the shape in which the grip portion 20A is bent to form a predetermined angle with respect to the body portion 10A (see FIG. 8).

In the stick-type electric tool 1A, the grip portion 20A is formed in a cylindrical shape.

The battery pack 30A is attached to the grip portion 20A. As shown in FIG. 8, the battery case 31A of the battery pack 30A includes a square tube portion 312 to be inserted into the cylinder of the grip portion 20A and the power storage unit 36 is provided in the square tube portion 312. The power storage unit 36 includes a plurality of all-solid-state batteries 35, each of which is formed in a sheet shape, and which are stacked one on top of another in the rightward/leftward direction, for example.

This battery pack 30 is attached to the grip portion 20A with the square tube portion 312 inserted into the cylinder of the grip portion 20A. In the battery pack 30A attached to the grip portion 20A, a lower portion of the battery pack 30A is exposed out of the bottom of the grip portion 20A. That is to say, at the end portion 202, located opposite from the body portion 10, of the grip portion 20A, at least part of the battery pack 30A is provided. In addition, in the battery pack 30A attached to the grip portion 20A, the connection terminal portion of the battery pack 30A is electrically connected to a feeder connection terminal provided inside the cylinder of the grip portion 20A so that power is supplied from the power storage unit 36 of the battery pack 30A to the driving unit 12, the control unit 14, and other components.

Note that the gun-type electric tool 1 and the stick-type electric tool 1A are only exemplary shapes of the electric tool according to the present disclosure. That is to say, the shape of the electric tool may be modified as appropriate.

Optionally, in the exemplary embodiment and variations described above, a buffer member made of synthetic rubber, for example, may be provided between the inner surface of the battery case 31, 31A and the power storage unit 36 to reduce the impact applied to the power storage unit 36.

Furthermore, in the exemplary embodiment and variations described above, the battery pack 30 may or may not be one of the constituent elements of the electric tool 1.

(Recapitulation)

As can be seen from the foregoing description, an electric tool (1) according to a first aspect includes a body portion (10), a grip portion (20), and a battery pack (30). The body portion (10) includes: a tool attachment member (11) to which a tool (40) is attached; a driving unit (12) to drive the tool (40); and a transmission unit (13) to transmit driving force of the driving unit (12) to the tool (40). The grip portion (20) is provided for the body portion (10) and includes a gripping part (21) to be held by a user (100) with his or her hand (110). The battery pack (30) supplies power to the driving unit (12). The battery pack (30) includes an all-solid-state battery (35).

According to this aspect, the battery pack (30) includes an all-solid-state battery (35), thus providing an electric tool (1) which may reduce the chances of causing liquid leakage and thereby reduce the chances of causing a malfunction to the battery pack (30), compared to a situation where the battery pack (30) includes a liquid battery.

In an electric tool (1) according to a second aspect, which may be implemented in conjunction with the first aspect, the battery pack (30) is attachable to, and removable from, the grip portion (20).

This aspect enables attaching the battery pack (30) to the grip portion (20) provided for the body portion (10).

In an electric tool (1) according to a third aspect, which may be implemented in conjunction with the first or second aspect, the battery pack (30) has a heavier weight than the body portion (10).

According to this aspect, if the electric tool (1) falls, the electric tool (1) will hit the ground with the battery pack (30), which is heavier than the body portion (10), facing down. This may reduce the impact applied to the body portion (10) by the fall. In addition, the battery pack (30) includes an all-solid-state battery (35) with higher impact resistance than a liquid battery. This may reduce, even when impact is applied to the battery pack (30) that has fallen, the chances of causing abnormality to the battery pack (30).

An electric tool (1) according to a fourth aspect, which may be implemented in conjunction with any one of the first to third aspects, further includes a suspension fitting (25) used to suspend the electric tool (1) from an object. The suspension fitting (25) is attached to at least one of the body portion (10) or the grip portion (20).

This aspect allows the electric tool (1) to be suspended from an object by using the suspension fitting (25).

In an electric tool (1) according to a fifth aspect, which may be implemented in conjunction with the first or second aspect, the battery pack (30) has a heavier weight than the body portion (10). The grip portion (20) includes: a first end portion (201); and a second end portion (202) located opposite from the first end portion (201) with respect to the gripping part (21). The body portion (10) is connected to the first end portion (201). The battery pack (30) is attached to the second end portion (202). A suspension fitting (25) for use to suspend the electric tool (1) from an object is attached to the second end portion (202), to which the battery pack (30) is attached, of the grip portion (20).

According to this aspect, the battery pack (30) is heavier than the body portion (10), and therefore, the center of mass of the electric tool (1) is located in a part, proximate to the battery pack (30), of the grip portion (20). The suspension fitting (25) is attached to the second end portion (202), to which the battery pack (30) is attached, of the grip portion (20), thus allowing the electric tool (1) to be suspended from a position close to the center of mass of the electric tool (1). This may reduce, when the user (100) is moving or doing some other type of work with the electric tool (1) suspended from a working belt (120) via the suspension fitting (25), the chances of the electric tool (1) being shaken significantly.

A battery pack (30) according to a sixth aspect is designed for use in the electric tool (1) according to any one of the first to fifth aspects and includes a battery case (31) to house the all-solid-state battery (35) therein.

According to this aspect, the battery pack (30) includes an all-solid-state battery (35), thus providing a battery pack (30) which may reduce the chances of causing liquid leakage and thereby reduce the chances of causing a malfunction to itself, compared to a situation where the battery pack (30) includes a liquid battery.

Note that the constituent elements according to the second to fifth aspects are not essential constituent elements for the electric tool (1) but may be omitted as appropriate.

REFERENCE SIGNS LIST

1 Electric Tool
10 Body Portion
11 Tool Attachment Member
12 Driving Unit
13 Transmission Unit
20 Grip Portion
21 Gripping Part
25 Suspension Fitting
30 Battery Pack
31 Battery Case
35 All-Solid-State Battery
40 Tool
100 User
110 Hand
201, 202 End Portion

The invention claimed is:

1. An electric tool comprising:
a body portion including:
  a tool attachment member to which a tool is attached;
  a driving unit configured to drive the tool; and
  a transmission unit configured to transmit driving force of the driving unit to the tool;
a grip portion provided for the body portion and including a gripping part designed to be held by a user with his or her hand; and
a battery pack configured to supply power to the driving unit, wherein:
the battery pack includes a plurality of all-solid-state batteries,
the grip portion includes:
  a first end portion; and
  a second end portion located opposite from the first end portion with respect to the gripping part,
the body portion is connected to the first end portion, and the battery pack is attached to the second end portion,
the battery pack has a heavier weight than the body portion,
each of the plurality of all-solid-state batteries is formed in a sheet shape,
the plurality of all-solid-state batteries are stacked one on top of another, and
a direction in which the plurality of all-solid-state batteries are stacked one on top of another is aligned with a line that connects together the first end portion and the second end portion.

2. The electric tool of claim 1, wherein the battery pack is attachable to, and removable from, the grip portion.

3. The electric tool of claim 2, further comprising a suspension fitting attached to at least one of the body portion or the grip portion and used to suspend the electric tool from an object.

4. The electric tool of claim 2, wherein
a suspension fitting for use to suspend the electric tool from an object is attached to the second end portion, to which the battery pack is attached, of the grip portion.

5. A battery pack for use in the electric tool of claim 2, the battery pack including a battery case configured to house the plurality of all-solid-state batteries therein.

6. The electric tool of claim 2, further comprising a battery case configured to house the plurality of all-solid-state batteries therein.

7. The electric tool of claim 1, further comprising a suspension fitting attached to at least one of the body portion or the grip portion and used to suspend the electric tool from an object.

8. A battery pack for use in the electric tool of claim 7, the battery pack including a battery case configured to house the plurality of all-solid-state batteries therein.

9. The electric tool of claim 7, further comprising a battery case configured to house the plurality of all-solid-state batteries therein.

10. The electric tool of claim 1, wherein
a suspension fitting for use to suspend the electric tool from an object is attached to the second end portion, to which the battery pack is attached, of the grip portion.

11. A battery pack for use in the electric tool of claim 10, the battery pack including a battery case configured to house the plurality of all-solid-state batteries therein.

12. The electric tool of claim 10, further comprising a battery case configured to house the plurality of all-solid-state batteries therein.

13. A battery pack for use in the electric tool of claim 1, the battery pack including a battery case configured to house the plurality of all-solid-state batteries therein.

14. The electric tool of claim 1, further comprising a battery case configured to house the plurality of all-solid-state batteries therein.

* * * * *